Patented Oct. 23, 1934

1,977,634

UNITED STATES PATENT OFFICE 1,977,634

PRODUCTION OF ALCOHOLS FROM OLEFINES

George Frederick Horsley, Norton-on-Tees, England, assignor to Imperial Chemical Industries Limited, a corporation of Great Britain No Drawing. Application May 4, 1932, Serial No. 609,275. In Great Britain May 16, 1931

17 Claims. (Cl. 260—156)

This invention relates to the production of alcohols by catalytic hydration of the corresponding olefines, and its principal object is to provide a new and improved catalyst for use in such process.

It has already been proposed to prepare ethyl alcohol by heating ethylene and water under pressure in the presence of inorganic salts with an affinity for ethylene, e. g., mercuric chloride. It has also been proposed to prepare ethyl alcohol by treating ethylene with steam at an elevated temperature under pressure in the presence of a dehydrating catalyst, e. g., thoria, or phosphoric acid deposited on charcoal. Further, it has been proposed to prepare alcohols by combining olefines with water in the vapor state at a temperature of at least 100° C. and in the presence of a metal of the platinum group, or gold, copper, iron, cobalt, nickel, chromium, tantalum, silver, vanadium, tungsten, molybdenum, or manganese, or salts or compounds thereof.

According to the present invention, in the catalytic hydration of olefines, a catalyst is employed consisting of or comprising boron phosphate. Such catalyst may be prepared in any suitable or known manner, e. g., by evaporating to dryness a mixture of phosphoric acid and boric acid, and is preferably purified before use, so that it is substantially free from free phosphoric acid or boric acid, e. g., by treatment with steam at a raised temperature whereby free phosphoric acid or boric acid if present is volatilized.

The reaction may be carried out in either the liquid phase or the vapor phase, preferably under increased pressure. Suitable temperatures are 150°–300° C. Thus, when working in the liquid phase the olefine gas may be compressed to say 100 atmospheres and brought into contact with an aqueous suspension of the boron phosphate catalyst. When working in the vapor phase, it is preferred to employ a large excess of olefine relative to water vapor, the gaseous reaction products being cooled to separate an aqueous solution of the alcohol which is formed and the surplus olefine being circulated.

Example 1

A mixture of 62 gms. boric acid and 200 gms. of an aqueous solution containing 100 gms. phosphoric acid was evaporated to dryness and the product, containing 106 gms. boron phosphate and 2 gms. excess phosphoric acid, was heated at 400° C. in a current of steam until all phosphoric acid was removed, i. e., until the liquid obtained by condensing the salt vapor gave no acid reaction to bromthymol-blue and left no residue on evaporation with a few drops of ammonia solution. This required about 6 hours. Over this catalyst was passed a mixture of equal volumes of propylene and steam at atmospheric pressure and a temperature of 200° C. and a space velocity of 1000 reciprocal hours. The reaction gases were cooled and a condensate obtained containing 1 per cent by weight of isopropyl alcohol, representing a yield of 98–99% of the propylene used up.

Example 2

Crude oil cracking gas was compressed to 120 atmospheres and mixed with steam at the same pressure, in the ratio of 88 volumes of gas to 22 of steam. The mixture was passed over a boron phosphate catalyst with a space velocity of 4300 reciprocal hours and at a temperature of 300° C. The product in grams per hour per litre of catalyst was as follows:

| | |
|---|---|
| Ethyl alcohol | 46 |
| Isopropyl alcohol | 4 |
| Acetaldehyde | 0.8 |
| Oil | 33 |

Example 3

Ethylene was compressed to 100 atmospheres and mixed with steam at the same pressure, in the ratio of 70 volumes of ethylene to 30 of steam. The mixture was passed over a boron phosphate catalyst with a space velocity of 6000 reciprocal hours and at a temperature of 290° C. The yield of alcohol was 155 grams per hour per litre of catalyst. There was no oil.

The temperatures, pressures and other reaction conditions specified in the above examples are to be construed as illustrative only, and may be varied considerably without departing from the concept of the invention. Thus, for example, temperatures somewhat above 300° C. and superatmospheric pressures varying from 1+ to above 500 atmospheres, may be used if desired.

As stated, the invention is applicable broadly to the hydration of olefines. It is particularly applicable to the hydration of the lower olefines, e. g., ethylene, propylene, and the butylenes.

I claim:

1. In the process of hydrating an olefinic material, the step which comprises reacting an olefine and water in the presence of a catalyst comprising essentially boron phosphate.

2. The process of claim 1 in which the boron phosphate is purified from free phosphoric acid or boric acid before use by treatment with steam at a raised temperature whereby free acid if present is volatilized.

3. The process of claim 1 in which the olefinic material contains ethylene.

4. The process of claim 1 in which the olefinic material contains propylene.

5. The process of claim 1 in which the reaction is carried on under superatmospheric pressure.

6. The process of claim 1 in which the reaction is carried on under superatmospheric pressure of about 100 atmospheres.

7. The process of claim 1 in which the reaction temperature is about 150° to 300° C.

8. The process of claim 1 in which the reaction is carried on in the liquid phase.

9. The process of claim 1 in which the reaction is carried on in the vapor phase.

10. The process claimed in claim 1 in which the reaction is carried out in the vapor phase with a large excess of olefine relative to water vapor, the gaseous products being cooled to separate an aqueous solution of the alcohol formed and the surplus olefine being recirculated.

11. Process for the catalytic hydration of olefines in which a catalyst is employed comprising essentially boron phosphate.

12. Process for the catalytic hydration of olefines in the vapor phase in which a catalyst is employed comprising essentially boron phosphate.

13. Process for the catalytic hydration of olefines in the vapor phase which includes the step of passing a mixture of olefine gas and steam in contact with a catalyst comprising essentially boron phosphate at a temperature of 150–300° C.

14. Process for the catalytic hydration of olefines which comprises compressing an olefine gas and bringing the compressed gas into contact with an aqueous suspension of boron phosphate, at a temperature of 150–300° C.

15. Process as claimed in claim 13, in which the reaction mixture contains a large excess of olefine relative to steam, the gaseous products being cooled to separate an aqueous solution of the alcohol formed and the surplus olefine being recirculated.

16. Process for the catalytic hydration of olefines which comprises compressing an olefine gas, mixing the compressed gas with steam at the same pressure and passing the mixture over a boron phosphate catalyst.

17. Process for the production of isopropyl alcohol which comprises hydrating propylene with the aid of boron phosphate as catalyst.

GEORGE FREDERICK HORSLEY.